(12) United States Patent
Kania et al.

(10) Patent No.: US 7,594,468 B2
(45) Date of Patent: Sep. 29, 2009

(54) WOODEN SPIRAL FOR FLAVORING WINE AND METHOD OF MANUFACTURING SAME

(75) Inventors: Bruce G. Kania, Bozeman, MT (US); David L. Zimmerman, Pony, MT (US)

(73) Assignee: Fountainhead, LLC, Shepherd, MT (US)

( * ) Notice: Subject to any disclaimer, the term of this patent is extended or adjusted under 35 U.S.C. 154(b) by 558 days.

(21) Appl. No.: 11/462,364

(22) Filed: Aug. 3, 2006

(65) Prior Publication Data

US 2008/0028942 A1 Feb. 7, 2008

(51) Int. Cl.
*C12F 1/00* (2006.01)
(52) U.S. Cl. .................... 99/277.1; 426/330.4; 426/422
(58) Field of Classification Search ............... 99/277.1, 99/277.2, 277; 426/422, 330.4
See application file for complete search history.

(56) References Cited

U.S. PATENT DOCUMENTS

| 273,860 | A | * | 3/1883 | Lachenmeyer ............. 99/277.1 |
|---|---|---|---|---|
| 1,976,091 | A | | 10/1934 | Pritchett |
| 2,086,073 | A | | 7/1937 | Francescon |
| 2,114,009 | A | | 4/1938 | Ramsay |
| 2,203,229 | A | | 6/1940 | Nilsson et al. |
| 2,487,594 | A | | 11/1949 | Rudnick |
| 2,876,692 | A | | 3/1959 | Gaisman |
| 3,372,633 | A | * | 3/1968 | Horlander, Jr. ............. 99/277.1 |
| 3,942,423 | A | | 3/1976 | Herzfeld |
| 4,173,656 | A | | 11/1979 | Duggins |
| 5,102,675 | A | | 4/1992 | Howell et al. |
| 5,481,960 | A | | 1/1996 | Sullivan |
| 5,537,913 | A | | 7/1996 | Vowles |
| 5,647,268 | A | | 7/1997 | Sullivan |
| 6,378,419 | B1 | | 4/2002 | Ecklein |
| 7,357,069 | B1 | * | 4/2008 | Karasch et al. ............. 99/277.1 |

* cited by examiner

*Primary Examiner*—Reginald L Alexander
(74) *Attorney, Agent, or Firm*—Antoinette M. Tease

(57) ABSTRACT

A wooden spiral for flavoring wine, comprised of a strip of wood that has been shaped into a spiral. The spiral expands after insertion into a wine bottle so that at least a portion of the spiral is in contact with the inside of the wine bottle. The strip of wood may be optionally toasted, infused with flavor, or made from pre-flavored wood. The wooden spiral optionally comprises a weight that causes the spiral to sink to the bottom of a wine bottle or barrel. A logo may be optionally embossed or otherwise imprinted onto the wooden spiral such that when the spiral expands inside a wine bottle, the logo is visible to a consumer. A method of manufacturing a wooden spiral for flavoring wine.

4 Claims, 2 Drawing Sheets

FIG. 1
FIG. 2
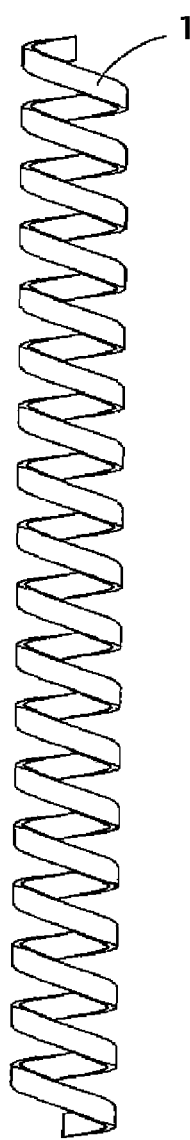
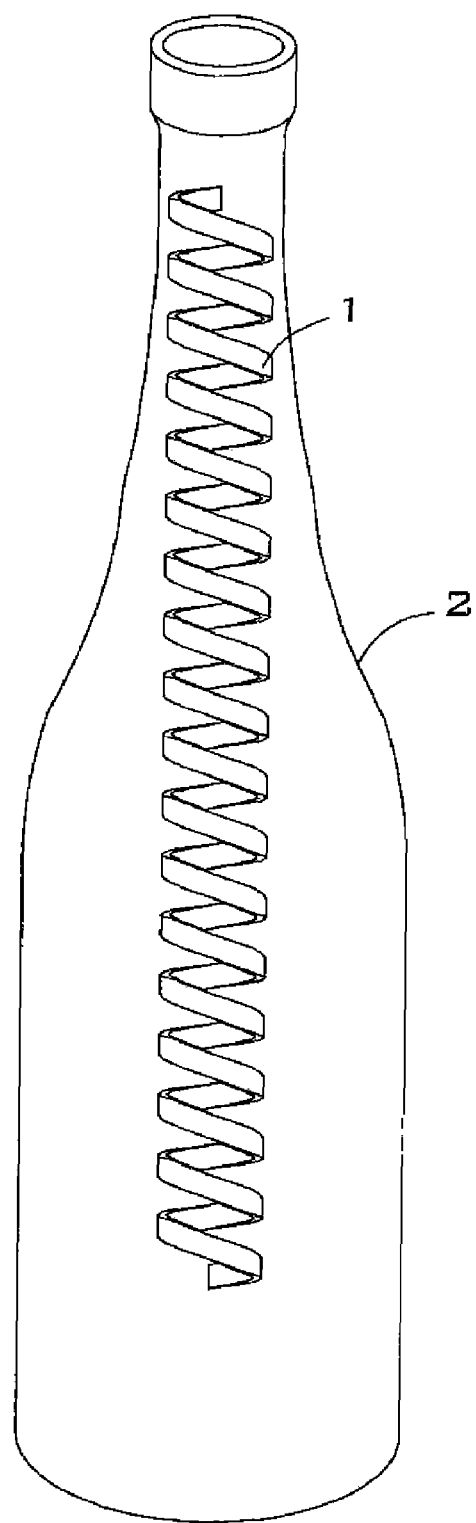

WOODEN SPIRAL FOR FLAVORING WINE AND METHOD OF MANUFACTURING SAME

BACKGROUND OF THE INVENTION

1. Field of the Invention

This invention relates generally to the field of wine, and more specifically, to a device for adding woody flavor to a wine.

2. Description of the Related Art

Currently the determination of when a wine is sufficiently "woody" occurs in a winery, where a wine master or professional wine taster makes a determination as to the optimal exposure of the wine to wood. The wood is typically in the form of a wine barrel, and the wine is aged inside a wooden barrel. Some wines are not exposed to wood and instead are fermented in steel tanks, but these wines will lack the desirable woody flavor.

There are several devices described in the prior art that are designed to be used with large wine barrels or tanks. For example, U.S. Pat. No. 6,378,419 (Ecklein, 2002) describes a device comprising an array of oak slabs that are inserted into containers ranging from 5 to 5000 gallons. U.S. Pat. No. 5,537,913 (Vowles, 1996) describes a container fitted with a plurality of air-filled wooden tubes that are inserted into the container. U.S. Pat. No. 5,647,268 (Sullivan, 1997) describes a device comprised of a plurality of wooden staves that are inserted into a wine barrel via the barrel bung. None of these devices is suitable for use with standard-size glass bottles, nor are they designed to be easy to use or aesthetically attractive.

There are several devices described in the prior art that can be used with standard-size wine bottles. For example, U.S. Pat. No. 2,487,592 (Rudnick, 1949) describes a wooden stick with shredded ends that is inserted into a bottle, after which the shredded ends expand. U.S. Pat. No. 3,942,423 (Herzfeld, 1976) describes a hollow wooden tube with a stopper at one end that can be installed in a bottle. U.S. Pat. No. 5,102,675 (Howell et al, 1992) describes treated wood chips that are placed into a permeable container and inserted into a wine container. All of these devices have disadvantages that are overcome by the present invention.

It is an object of the present invention to offer a device that allows not only the wine maker but also the consumer to adjust the strength of the woody flavor that is present in a bottled wine. It is a further object of the present invention to provide a flavor-adjusting device for wine that is economical, easy to use, and aesthetically attractive. In addition, it is an object of the present invention to provide a flavoring device that is optimized for use in standard-size (750 and 1500 milliliter) glass wine bottles.

BRIEF SUMMARY OF THE INVENTION

The present invention is a wooden spiral for flavoring wine, comprised of a strip of wood that has been shaped into a spiral. In a preferred embodiment, the width of the strip is in the range of 4 to 12 millimeters, the thickness of the strip is in the range of 0.4 to 1.5 millimeters, and the length of the strip is in the range of 600 to 1200 millimeters. In yet another preferred embodiment, the strip of wood is approximately 6 mm wide, 0.8 mm thick, and 900 mm long, wherein the strip is formed into a spiral.

In a preferred embodiment, the length of the spiral is approximately 220 millimeters. Preferably, the spiral expands after insertion into a wine bottle so that at least a portion of the spiral is in contact with the inside of the wine bottle.

The strip of wood is preferably comprised of wood selected from the group consisting of oak, cherry, cedar, mesquite and beech. The wood from which the strip is made is optionally toasted and/or infused with flavor prior to insertion into a wine bottle or barrel. Alternately, the strip of wood is comprised of pre-flavored wood. The strip of wood may be optionally degasified prior to insertion into a wine bottle or barrel.

The wooden spiral optionally further comprises a weight, wherein the weight is comprised of a material suitable for insertion into a wine bottle or barrel. In a preferred embodiment, the weight is comprised of ceramic glass. The weight is optionally color-coded. Optionally, a logo is embossed or otherwise imprinted onto the wooden spiral such that when the spiral expands inside a wine bottle, the logo is visible to a consumer.

The present invention also encompasses a method of manufacturing a wooden spiral for flavoring wine, comprising the steps of: cutting, splitting or slicing a strip of wood from a wooden board; softening the strip of wood by soaking it in water; heating it; winding the strip of wood around a mandrel to form a spiral; and allowing the spiral to dry. The method optionally comprises the additional step of toasting and/or infusing the strip of wood with flavor.

BRIEF DESCRIPTION OF THE DRAWINGS

FIG. 1 is a side view of an unused wooden spiral prior to being inserted into a bottle of wine.

FIG. 2 is a side view of a wooden spiral after being placed in a bottle of wine but prior to expansion.

REFERENCE NUMBERS

Figure 3:
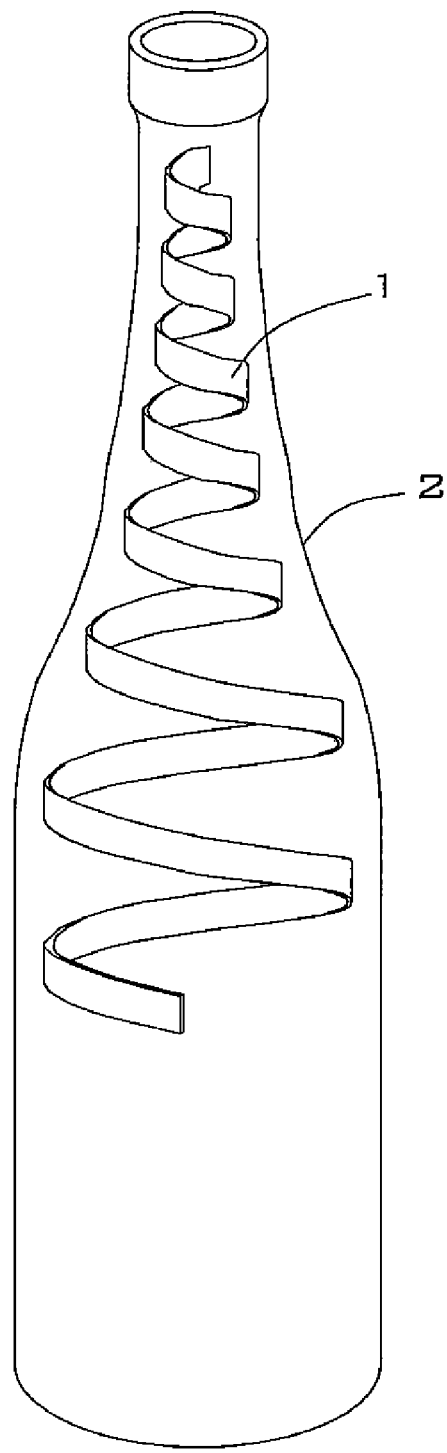
FIG. 3 is a side view of a floating wooden spiral in a bottle of wine after the spiral has fully expanded and is in contact with the inner surface of the bottle.

1 Wooden spiral
2 Bottle
3 Weight
4 Logo

DETAILED DESCRIPTION OF INVENTION

It is well known that different grades of wood impart different flavors to wine. This invention provides both wine makers and consumers with the ability to make their own determination relative to an optimal "woody" or "toasted" flavor. It also allows a consumer to convert an otherwise low grade wine to a premium, woody wine. Furthermore, the present invention provides an economical and easily employable means for inserting flavoring wood into a bottle of wine.

The present invention is a specially prepared, spiral-wound strip of wood that can be inserted through the neck of a wine bottle into the bottle. The device may be inserted by the wine maker during the bottling process, or alternately, by the consumer by removing the bottle seal and inserting the device into the bottle via the bottle neck. The consumer would then reseal the bottle with a conventional stopper. Unlike other prior art devices, the present invention is not attached or connected to the stopper. The natural wood flavors present in the wood leach into the wine, thereby imparting a desirable flavor and/or aroma to the wine.

The consumer may optionally use the present device by opening a previously unopened bottle of wine, inserting a spiral, and then using a commercially available extraction pump to evacuate air that has entered the bottle, thereby preventing any undesirable effects of the wine being exposed to air.

The wooden spiral device of the present invention is manufactured by cutting, splitting or slicing strips of wood from wooden boards. In one embodiment, the strips are approximately 6 millimeters (mm) wide, 0.8 mm thick, and 900 mm long prior to being formed into a spiral. The relatively thin cross-sectional area of the device provides a large surface area-to-volume ratio for the device, which results in a relatively fast transfer of flavor from the wood to the wine from a small mass of wood. Unlike other prior art devices, the wooden spiral of the present invention can be fashioned entirely from the most choice portion of the wood due to its thinness, whereas a rod would normally be thicker and would likely result in more waste as it is fabricated.

The strips are optionally toasted and/or infused with flavors (for example, vanilla) to enhance or strengthen the flavoring characteristics of the wood. The strips are then softened by soaking in water, heated, wound around a mandrel, allowed to dry, and then removed from the mandrel and packaged. The heating can be accomplished by steaming, dipping the wooden strip into boiling water, using an iron, or heating the mandrel, among other methods. The resulting product is a spiral-shaped wooden strip.

The outside diameter of the spiral is preferably set to a maximum of about 17 millimeters so that the device may be easily inserted through the opening in a standard 750 milliliter (ml) wine bottle. The length of the spiral is preferably about 220 mm so that the spiral fits inside of a standard 750 ml wine bottle that is stoppered. After the device soaks in the wine for period of about 6 to 48 hours, the device absorbs a portion of the liquid, causing the spirals of the device to loosen, which results in the spiral diameter increasing until the wood contacts the inside surface of the bottle. The gradual expansion of the spiral diameter is visible through the bottle and serves as an indicator of the length of time that the device has been in the bottle.

The final shape of the device at maximum diameter, when pushed against the inside surface of the bottle, is aesthetically pleasing. The wood lining may also serve to reduce light entry into the bottle, which helps preserve flavor of the wine. The wood lining may also be used to display a logo or text when it expands to the final position, if the proper marks or characters are properly positioned on the wood strip. The characters or marks may be burned into the wood, or they may be imprinted with inert or nontoxic ink.

Although white oak is the standard wood for flavoring wine, the device of the present invention can be manufactured from other wood species, such as cherry, cedar, mesquite or beech, which may be preferred by individual consumers. Additionally, the small relative size of the device allows the use of wood species that may be unavailable for making traditional wine barrels because of small available board size or high cost of the wood; therefore, the device provides flavoring from woods that are not currently available using wooden barrel aging methods. The wood strips may optionally be manufactured from pre-flavored wood, such as wood from used sherry casks.

If the consumer prefers a relatively mild wood flavor, the device may be removed from the bottle after a predetermined time period by grasping the upper end with a pair of tweezers or needle nosed pliers, and withdrawing it through the neck of the bottle. If the consumer prefers a relatively strong wood flavor, additional devices may be placed into the bottle, and/or the device may be left in the bottle for a longer time prior to consumption of the wine. The spiral may also be optionally removed from the bottle after it has been emptied, in order to reuse or recycle the bottle.

FIG. 1 is a side view of an unused wooden spiral prior to being placed in a bottle of wine. As shown in this figure, the spiral prior to use is relatively tightly wound, as compared to FIGS. 3 and 4, when the spiral has unwound after soaking in the wine for a period of time.

FIG. 2 is a side view of a wooden spiral after being placed in a bottle of wine, but prior to expansion. This figure shows the position of the spiral when it is floating, i.e., used without a weight. In an alternate embodiment, shown in FIG. 4, the spiral may be manufactured with a weight that serves to maintain the spiral in a position closer to the bottom of the bottle.

FIG. 3 is a side view of a floating wooden spiral in a bottle of wine, after the spiral has fully expanded, and is in contact with the inner surface of the bottle. The inventors have observed that this expansion typically occurs within a 24-hour period after inserting the spiral into the bottle.

Figure 4:
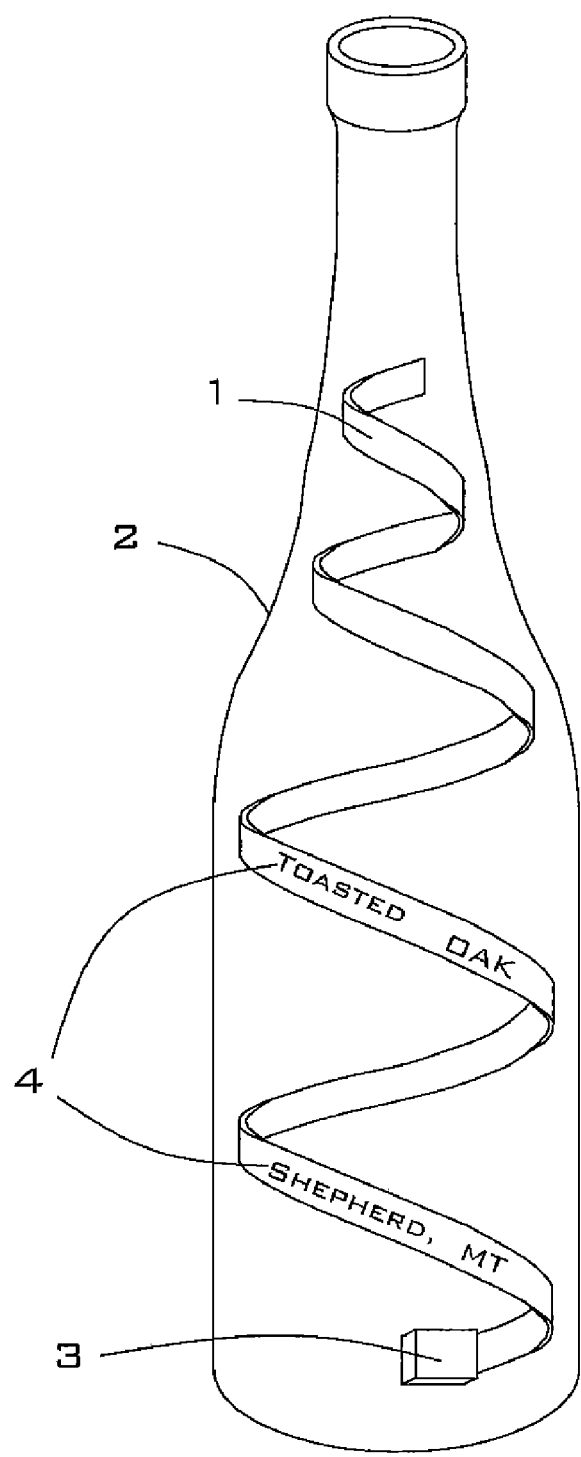
FIG. 4 is a side view of a weighted wooden spiral in a bottle of wine after the spiral has fully expanded and is in contact with the inner surface of the bottle.

FIG. 4 is a side view of a weighted wooden spiral of a bottle of wine, after the spiral has fully expanded, and is in contact with the inner surface of the bottle. The purpose of the weight is to cause the spiral to sink to the bottom of the bottle, which may improve the aesthetic appearance, or make the wine easier to pour, or make the bottle easier to seal. The weight may be comprised of any suitable material that does not react with or leach matter into the wine. An example of a suitable weight material is ceramic glass. The weight may optionally be color coded to denote the type of wood used in the spiral, or to denote other relevant information. Also shown is an optional logo that is only legible after the spiral has expanded. Since the markings on the spiral are contacting the inner surface of the bottle, they are more legible than if they were not in contact with the inner bottle surface.

The present invention has numerous advantages over prior art devices. First, the wooden spiral allows for a higher level of wood surface exposure to wine than a conventional barrel. Second, the wooden spiral is sized to fit through the top and neck of a bottle and then expands to fit around the inside contours of a wine bottle, providing an interesting aesthetic affect. Third, the wooden spiral may be inserted into the bottle after purchase of the bottle by a consumer, and the consumer may use a commercially available one-way valve to prevent undesirable fermentation.

Fourth, a wide range of wooden spirals, all offering unique flavor options, can be made available to consumers. Cherry, beech, and other high tannin woods represent the wide range of potential materials from which the wooden spiral can be made. Fifth, the wooden spirals can be optionally degasified, toasted, or imbued with other flavor agents, allowing consumers a still greater range of flavor and quality options. Sixth, the relative thinness of the spiral combined with the solvent characteristics of the ethanol present in the wine allow for a relatively fast "woody" flavor result.

Seventh, gas optionally present in a wooden spiral that has not been degasified presents a bubble effect when a vacuum is applied, similar to that observed with champagne. Eighth, adding a negative buoyant feature (i.e., a weight) to the bottom of a spiral optionally ensures that the spiral is optimally positioned within a bottle. Ninth, larger spirals may be used within barrels or other tanks as a means by which wine manufacturers can speed up wine flavoring. Because the size and surface area of the wooden spiral can be carefully designed to optimize flavor enhancement, the present invention allows for more precision and less expense for the wine maker.

Tenth, once a spiral expands upon exposure to the wine, it form fits against the inside curvature of a container and does not restrict pouring of the wine. Lastly, the spiral may optionally be removed from the bottle at any time.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A wooden spiral for flavoring wine, comprised of a strip of wood that has been shaped into a spiral and further comprising a weight, wherein the weight is comprised of a material suitable for insertion into a wine bottle or barrel, wherein the spiral comprises two ends, wherein the weight is attached to one end of the spiral, and wherein the weight is not attached to any part of the bottle or barrel.

2. The wooden spiral of claim 1, wherein the weight is comprised of ceramic glass.

3. A method of manufacturing the wooden spiral of claim 1, comprising the steps of:
   (a) cutting, splitting or slicing a strip of wood from a wooden board;
   (b) softening the strip of wood by soaking it in water;
   (c) heating the strip of wood;
   (d) winding the strip of wood around a mandrel to form a spiral;
   (e) allowing the spiral to dry; and
   (f) attaching the weight to the spiral.

4. The method of manufacture of claim 3, further comprising the step of toasting and/or infusing the strip of wood with flavor.

* * * * *